United States Patent
Vanderzyden et al.

(10) Patent No.: US 9,115,794 B2
(45) Date of Patent: Aug. 25, 2015

(54) INTEGRATED DRIVE GENERATOR PUMP PLATE

(75) Inventors: Henry R. Vanderzyden, Byron, IL (US); Jonathan C. Dell, Carpentersville, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 557 days.

(21) Appl. No.: 13/543,247

(22) Filed: Jul. 6, 2012

(65) Prior Publication Data

US 2014/0009126 A1   Jan. 9, 2014

(51) Int. Cl.
| | |
|---|---|
| *H02P 15/00* | (2006.01) |
| *H02P 9/00* | (2006.01) |
| *F16H 39/12* | (2006.01) |
| *F16H 47/02* | (2006.01) |
| *F02C 7/32* | (2006.01) |
| *H02K 7/116* | (2006.01) |

(52) U.S. Cl.
CPC ......... *F16H 39/12* (2013.01); *F02C 7/32* (2013.01); *F16H 47/02* (2013.01); *H02K 7/116* (2013.01)

(58) Field of Classification Search
USPC ....................................... 322/40, 44
See application file for complete search history.

(56) References Cited

U.S. PATENT DOCUMENTS

| | | | |
|---|---|---|---|
| 4,046,029 | A | 9/1977 | Sugden |
| 4,550,645 | A | 11/1985 | Beck, Jr. |
| 4,794,756 | A | 1/1989 | Iseman |
| 4,951,706 | A | 8/1990 | Kardos |
| 5,074,768 | A | 12/1991 | Kawamura et al. |
| 5,593,285 | A | 1/1997 | Watts |
| 6,196,109 | B1 | 3/2001 | Zumbusch et al. |
| 6,361,285 | B1 | 3/2002 | Lehner |
| 6,799,953 | B2 | 10/2004 | Nelson |
| 7,472,547 | B2 | 1/2009 | Grosskopf et al. |
| 2008/0145645 | A1* | 6/2008 | Lemke et al. .......... 428/323 |

* cited by examiner

*Primary Examiner* — Tulsidas C Patel
*Assistant Examiner* — Thomas Quigley
(74) *Attorney, Agent, or Firm* — Carlson, Gaskey & Olds, P.C.

(57) ABSTRACT

An integrated drive generator includes a pump plate having first and second parallel faces defining a first thickness. A passage extends between the first and second faces through the pump plate. Webbing is provided in the passage having a second thickness less than the first thickness. The webbing provides a first volume and the passage provides a second volume. A ratio of the second volume to the first volume is 20.8.

10 Claims, 4 Drawing Sheets

INTEGRATED DRIVE GENERATOR PUMP PLATE

BACKGROUND

This disclosure relates to an integrated drive generator for aerospace applications, for example. More particularly, the disclosure relates to a pump plate for a hydraulic unit of the integrated drive generator.

One example type of integrated drive generator (IDG) includes a generator, a hydraulic unit and a differential assembly arranged in a common housing. The differential assembly is operatively coupled to a gas turbine engine via an input shaft. The rotational speed of the input shaft varies during the operation of the gas turbine engine. The hydraulic unit cooperates with the differential assembly to provide a constant speed to the generator throughout engine operation.

The hydraulic unit includes a pump plate that separates variable and fixed pumping assemblies. The pumping assemblies communicate fluid between first and second passages in the pump plate to vary the rotational output of the hydraulic unit and provide the constant speed. One example pump plate provides a flow rate of 0.35 in$^3$/rev with the first and second passages having volumes of 0.150 in$^3$ (2.46 cm$^3$) and 0.161 in$^3$ (2.64 cm$^3$), providing flow rate to volume ratios of 2.33 and 2.17. The first and second passages include webbing reinforcements, which have a volume ratio compared to the open area of 9.7% to 17.2%. The pump plate is constructed of cast ductile iron and has a thickness of 0.625 inch (1.59 cm). The ratio of flow rate to webbing volume is 10. For a higher output IDG, the pump plate permits inadequate flow through the passages and may be too weak.

SUMMARY

In one exemplary embodiment, an integrated drive generator includes a pump plate having first and second parallel faces defining a first thickness. A passage extends between the first and second faces through the pump plate. Webbing is provided in the passage having a second thickness less than the first thickness. The webbing provides a first volume and the passage provides a second volume. A ratio of the second volume to the first volume is 20.8.

In a further embodiment of any of the above, the integrated drive generator includes a hydraulic unit that includes the pump plate arranged between pumping elements configured to communicate fluid flow through the pump plate. A ratio of flow rate to second volume is 2.5.

In a further embodiment of any of the above, the first thickness is 0.595 inch (1.51 cm).

In a further embodiment of any of the above, the flow rate is 0.40 cubic inch per revolution.

In a further embodiment of any of the above, the ratio of the flow rate to the first volume is greater than 10.

In a further embodiment of any of the above, the ratio of the flow rate to the first volume is 19.

In a further embodiment of any of the above, the pump plate is constructed from a cast ductile iron.

In a further embodiment of any of the above, the integrated drive generator includes a generator and a differential assembly. The hydraulic unit and the differential assembly cooperate with one another to provide a constant speed to the generator.

In a further embodiment of any of the above, the passage is provided by multiple discrete passages. The webbing is provided by multiple discrete webs.

In a further embodiment of any of the above, a ratio of a flow rate through the passage to a thickness of the pump plate is 0.67.

BRIEF DESCRIPTION OF THE DRAWINGS

The disclosure can be further understood by reference to the following detailed description when considered in connection with the accompanying drawings wherein.

DETAILED DESCRIPTION

Figure 1:
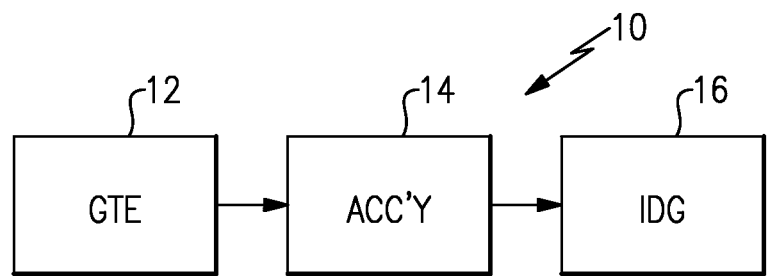
FIG. 1 is a highly schematic view of a generator system.

An example generator system 10 is schematically illustrated in FIG. 1. The system 10 includes a gas turbine engine 12 that provides rotational drive to an integrated drive generator (IDG) 16 through an accessory drive gearbox 14 mounted on the gas turbine engine 12. The accessory drive gearbox 14 is coupled to a spool of the engine 12, and the speed of the spool varies throughout engine operation.

Figure 2:
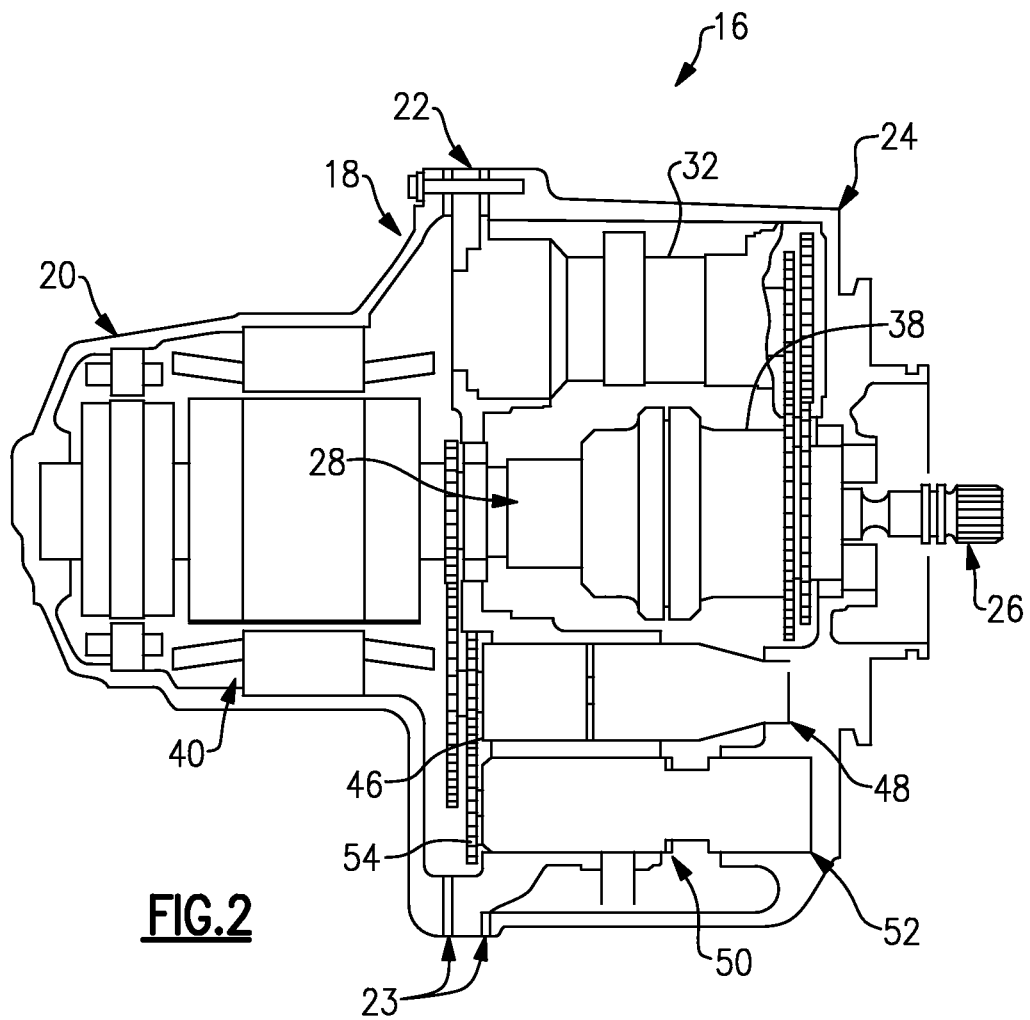
FIG. 2 is a cross-sectional schematic view of an example integrated drive generator.
Figure 3:
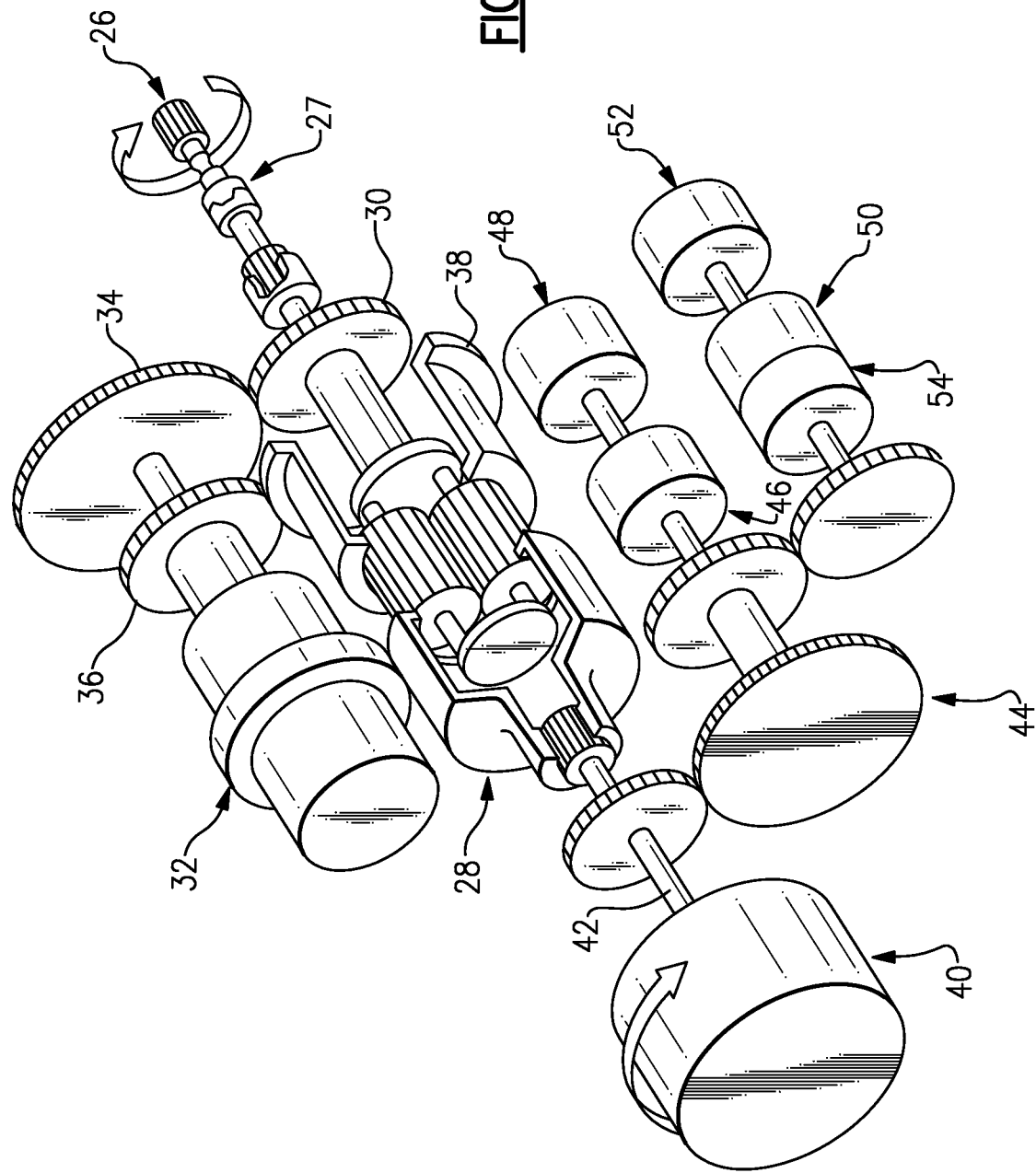
FIG. 3 is a schematic perspective view of a generator, a hydraulic unit and a differential assembly of the integrated drive generator shown in FIG. 2.

Referring to FIGS. 2 and 3, an example IDG 16 is illustrated. In the example, the IDG 16 includes a housing 18 having generator, center and input housing portions 20, 22, 24 secured to one another. A generator 40 is arranged in the generator housing portion 20. Seal plates 23 are provided on either side of the center housing 22 to seal the center housing 22 relative to the generator and input housing portions 20, 24.

An input shaft 26 receives rotational drive from the accessory drive gearbox 14. The rotational speed of the input shaft 26 varies depending upon the operation of the engine 12. To this end, as a result, a hydraulic unit 32 cooperates with the differential assembly 28 to convert the variable rotational speed from the input shaft 26 to provide a fixed rotational output speed to the generator 40.

The input shaft 26 rotationally drives a differential input gear 30 that is coupled to a hydraulic input gear 34 of the hydraulic unit 32. The differential input gear 30 is operatively coupled to the input shaft 26 by the disconnect assembly 27. The hydraulic output gear 36 is coupled to a differential speed trim gear 38. The hydraulic unit 32 increases or decreases the rotational speed provided to the differential output gear 28 from the hydraulic output gear 36 to provide a fixed rotational output speed, such as a 12,000 rpm speed. The variable rotational speed of the differential input gear 30 combines with the speed of the differential trim gear 38 to provide a fixed rotational speed to the differential output gear 28 and generator input shaft 42.

In the example, a geartrain 44 cooperates with the generator input shaft 42, which rotates at a constant speed to rotationally drive a charge pump 46, deaerator 48, main scavenge pump 50, inversion pump 52 and generator scavenge pump 54. Thus, these components may be designed efficiently to operate at a fixed speed.

Figure 4:
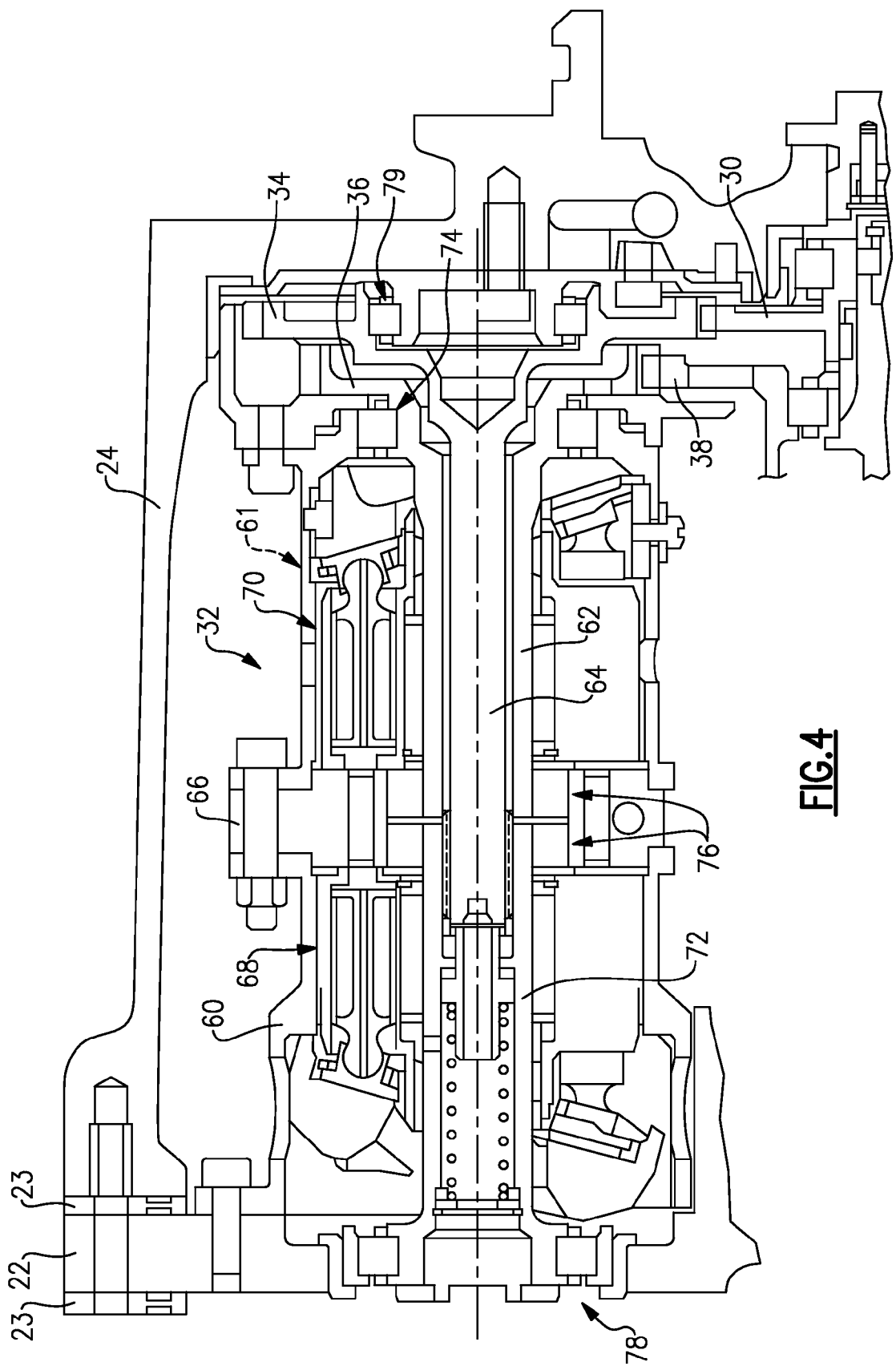
FIG. 4 is a cross-sectional view through the hydraulic unit.

Referring to FIG. 4, the hydraulic unit 32 includes a can 60 that houses and provides structural support for the hydraulic unit components. Trim and variable speed shafts 62, 64 are arranged coaxially with and nested relative to one another on one side of the hydraulic unit 32. The hydraulic input gear 34 is provided by the variable speed shaft 64, and the hydraulic output gear 36 is provided by the trim speed shaft 62.

A first bearing 74 supports the trim speed shaft 62 relative to the can 61, and a second bearing 76 supports the other end of the trim speed shaft 62 relative to the pump plate 66. Another second bearing 76 supports the speed change shaft 72 relative to the pump plate 66, and a third bearing 78 supports the other end of the speed change shaft 72 relative to the center housing 22. A fourth bearing 79 supports the variable speed shaft 64 relative to the input housing 24.

A speed change shaft 72 is also arranged within the can 60 and is coaxial with the trim and variable speed shafts 62, 64. A pump plate 66, which is constructed from a cast ductile iron, separates first and second pumping assemblies 68, 70, which each include a wobbler and pistons. The pumping assemblies cooperate with one another to increase or decrease the rotational speed of the trim speed shaft 62, providing a flow rate of 0.40 in$^3$/rev through the pump plate 66.

Figure 5:
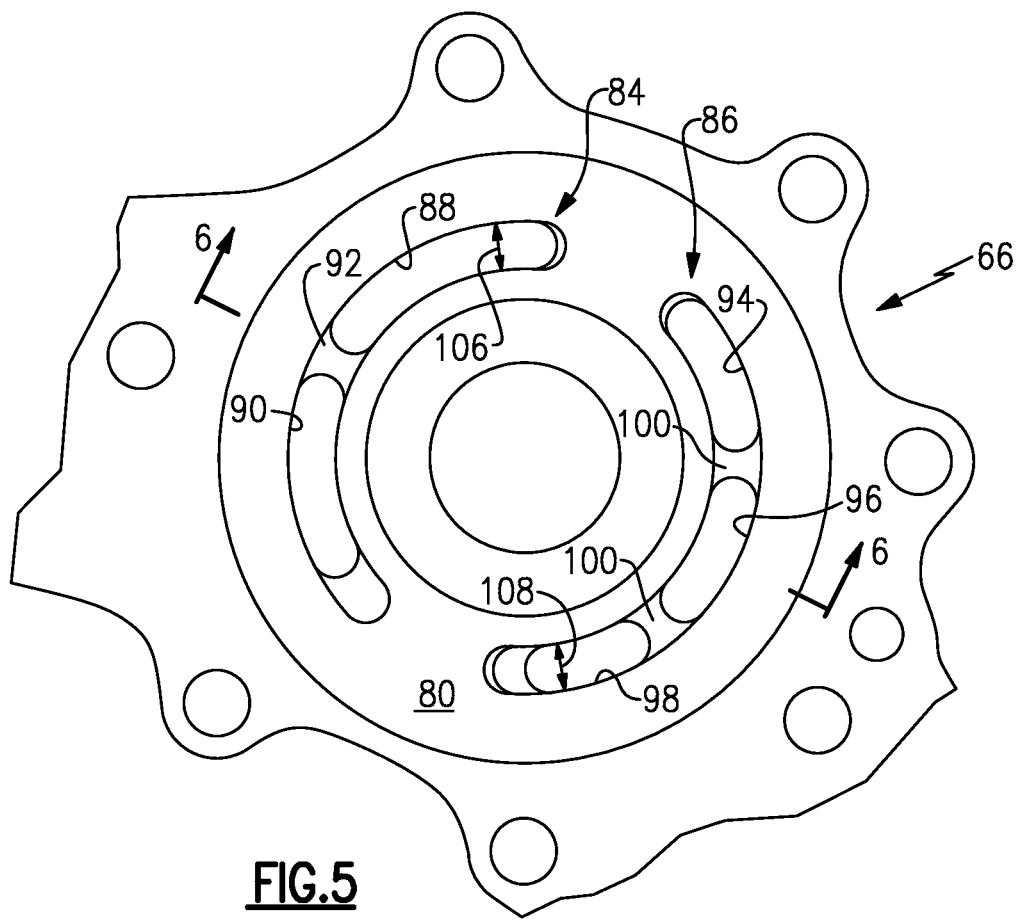
FIG. 5 is an elevational view of a portion of a pump plate.
Figure 6:
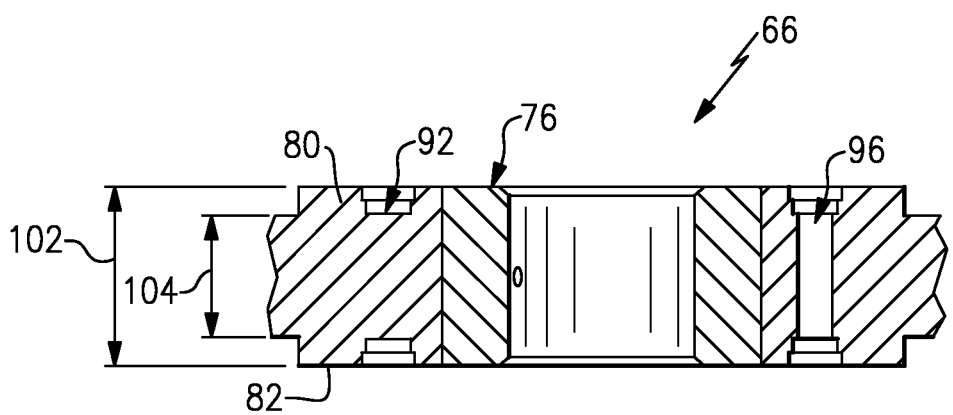
FIG. 6 is a cross-sectional view of the pump plate illustrated in FIG. 5 and taken along line 6-6.

Referring to FIGS. 5 and 6, the pump plate 66 is illustrated in more detail. The pump plate 66 includes first and second spaced apart lateral surfaces 80, 82. First and second passages 84, 86 are provided in the pump plate 66 and extend between the first and second parallel faces 80, 82 to communicate fluid between the first and second pumping assemblies 68, 70 (FIG. 4).

The first passage 84 is provided by a group of arcuate first and second passageways 88, 90 that are adjacent to one another. Webbing 92 is provided adjacent to the first and second passageways 88, 90 for strength. The webbing 92 is recessed relative to the first and second faces 80, 82 in the example shown. In a similar manner, the second passage 86 is provided by third, fourth and fifth passageways 94, 96, 98. The second passage 86 includes webbing 100.

In the example, the webbing 92 and 100 has a second thickness 104 that is less than the first thickness 102, which defines the distance between the first and second faces 80, 82. In one example, a ratio of the second thickness to the first thickness is in the range of 0.65 to 0.75, and the first thickness is 0.595 inch (1.51 cm). The pump plate 66 is thinner while providing an increased flow rate with adequate structural integrity.

The open areas of the first and second passageways 84, 86 are provided by first and second radial widths 106, 108, respectively. In the example, the first and second passageways 88, 90 together provide an open volume of 0.154 in$^3$ (2.52 cm$^3$). The third, fourth and fifth passageways 94, 96, 98 together provide a second open volume of 0.170 in$^3$ (2.79 cm$^3$).

The open volumes exclude the portions of webbing recessed from the lateral faces and only include the regions extending entirely between the first and second faces 80, 82.

The ratio of the volume of webbing 92 to the first open volume is 4.8%, and the volume of webbing 100 to the second open volume is 8.4%. Thus, the ratio of flow rate to webbing volume is greater than 10, and in the example 19.

In one example, the ratio of open volume of the first passage 84 to the pumping volume is 40.5%. The ratio of the second open volume of the second passage 86 to the pumping rate is 46.5%. The total open volume of the first passage 84 is 0.162 in$^3$ (2.65 cm$^3$) and the total open volume of the second passage 86 is 0.186 in$^3$ (3.05 cm$^3$).

Although an example embodiment has been disclosed, a worker of ordinary skill in this art would recognize that certain modifications would come within the scope of the claims. For that reason, the following claims should be studied to determine their true scope and content.

What is claimed is:

1. An integrated drive generator comprising:
 a pump plate having first and second parallel faces defining a first thickness, and a passage extending between the first and second faces through the pump plate, webbing provided in the passage having a second thickness less than the first thickness, the webbing providing a first volume and the passage providing a second volume, and a ratio of the second volume to the first volume of 20.8.

2. The integrated drive generator according to claim 1, comprising a hydraulic unit including the pump plate arranged between pumping elements configured to communicate fluid flow through the pump plate, and a ratio of flow rate to second volume of 2.5.

3. The integrated drive generator according to claim 2, wherein the first thickness is 0.595 inch (1.51 cm).

4. The integrated drive generator according to claim 2, wherein the flow rate is 0.40 cubic inch per revolution.

5. The integrated drive generator according to claim 4, wherein the ratio of the flow rate to the first volume is greater than 10.

6. The integrated drive generator according to claim 5, wherein the ratio of the flow rate to the first volume is 19.

7. The integrated drive generator according to claim 2, wherein the pump plate is constructed from a cast ductile iron.

8. The integrated drive generator according to claim 2, comprising a generator and a differential assembly, the hydraulic unit and the differential assembly cooperating with one another to provide a constant speed to the generator.

9. The integrated drive generator according to claim 1, wherein the passage is provided by multiple discrete passages, and the webbing is provided by multiple discrete webs.

10. The integrated drive generator according to claim 1, wherein a ratio of a flow rate through the passage to a thickness of the pump plate is 0.67.

* * * * *